United States Patent Office 3,527,586
Patented Sept. 8, 1970

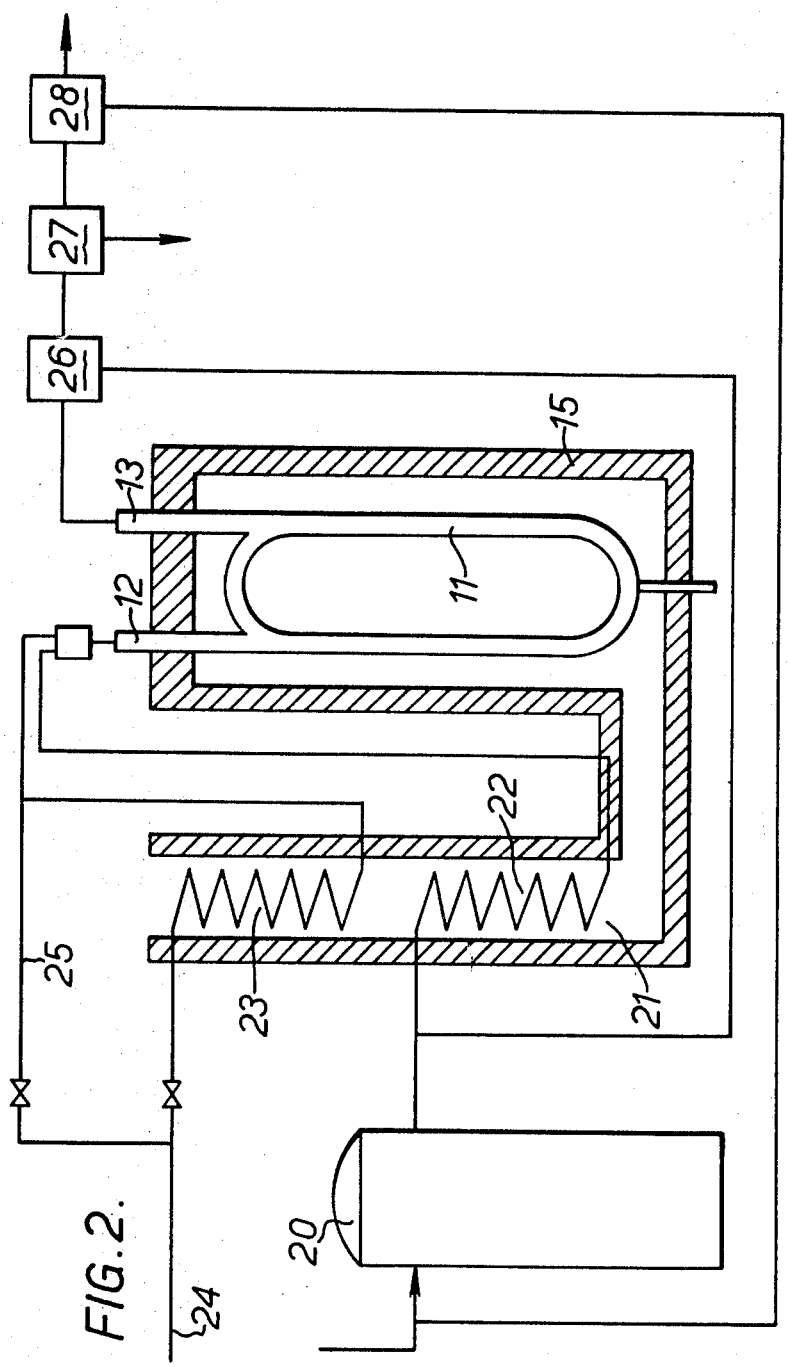

3,527,586
PRODUCTION OF FUEL GAS
Cecil G. Pettit, Smethwick, England, assignor to Wellman Incandescent Furnace Company Limited, a British company
Filed Nov. 3, 1966, Ser. No. 591,770
Claims priority, application Great Britain, Nov. 3, 1965, 46,670/65
Int. Cl. C01b 2/14
U.S. Cl. 48—214          6 Claims

ABSTRACT OF THE DISCLOSURE

Process and apparatus for the production of fuel gases from a hydrocarbon feed which comprises introducing the hydrocarbon feedstock and steam into a loop reactor such that the mean number of circulations of the material fed to the reactor is in the range of from about 1 to about 6. The parameters of the reactor, e.g. loop length and cross-section, injection velocities, are such that the mean residence time of the material fed to the reactor is at least about 0.5 second. The reaction temperatures employed to effect the chemical conversion of the feedstock to a fuel gas are in the range of up to about 900° C.

This invention relates to the production of fuel gas, and for purposes of this specification, "fuel gas" is intended to include town gas, producer gas, water gas, cracked oil gases and like lean, normal or rich gases capable of combustion.

It is known that fuel gas may be produced by thermal conversion of a hydrocarbon stock, for example a hydrocarbon distillate, in the presence of steam, and an object of the present invention is to provide an efficient and versatile process and apparatus which is economical to run and also which is capable of operating with a wide variety of hydrocarbon feed stocks.

In accordance with one aspect of the invention there is provided a process for the production of fuel gases from a hydrocarbon feed which comprises introducing a hydrocarbon feedstock and steam into a loop reactor under conditions such that at least a portion of the material fed to the reactor is circulated more than once, the loop reactor being at a temperature such as to effect chemical conversion of the feedstock to a fuel gas, and extracting products from said reactor.

Preferably the various parameters such as loop length and cross-section, injection velocities, pressures and outlet size and disposition are arranged so that the mean residence time is at least about 0.5 second. The concept of mean residence time is necessary in this reactor as a part of the reactor mixture is being recirculated for considerably longer while a part may be resistent for less than 0.5 second. Preferred mean residence times are of the order of 1 or 1.1 seconds.

In accordance with a further aspect of this invention a reactor for gasification processes comprises at least one closed loop having an inlet for reactor feed to be gasified, an outlet for gasified products and means for applying heat externally to the said reactor.

The words "loop vessel" are used herein to include vessels of various configurations in which a continuous loop-like path is provided for the reactants. For example, the loop vessel may be purely toroidal, or merely approximately toroidal consisting of parallel straight tube portions each interconnected at each end by semi-circular extending portion. Alternatively the loop may consist of a series of straight tube portions angularly related to make up a polygonal loop, or of a somewhat cylindrical vessel housing a centrally located axially extending liner so that the liner forms one leg of the loop and the surrounding annular space forms the remaining part of the loop. In a further alternative the reactor comprises two loops having a common arm into which the feed is introduced, the reaction mixture being split into two streams at the end of said common arm.

In general the loop vessel may be located in any plane or inclination unless the feed stock is one apt to produce ash as a by-product and in such case the loop is preferably located with the tube axis in a vertical or inclined plane and with an ash sump at the lowest position. It is generally most convenient to suspend the loop vessel vertically.

The reaction taking place in the vessel will depend upon the nature of the feed and to some extent the reaction conditions. Normally the reactions will be endothermic and the heat input may be achieved both by pre-heating the steam and/or the hydrocarbon feed stock either before or after mixing. The reactor is preferably located in a furnace to provide an additional supply of heat. Furnace temperatures of up to 1200° C. are generally satisfactory, this being sufficient, with pre-heating of the feed, to achieve a reaction temperature of up to about 900° C. The actual reaction temperature will normally be from about 625° C. to about 900° C. depending upon the feedstock employed and the desired products.

If desired catalysts may be employed but in general it is preferred to carry out non-catalysed reactions as they are more economical particularly when contaminated feedstocks are employed which may lead to poisoning of the catalyst.

It is desirable that the inlet and outlet should be located in proximity to one another; this may be achieved by the use of closely parallel inlet and outlet tubes or an annular outlet may surround the inlet.

The mean residence time of the feedstock in the reaction vessel should be more than 0.5 second in order to ensure the establishment of complete equilibrium between feed and products. It is however difficult or impracticable to produce residence times in excess of about 1.1 seconds without using either extremely high pressures, of the order of 10 atmospheres or using very high inlet velocities such as hypersonic velocities.

Residence times of the order of 0.65 second are satisfactory and 0.8 to 1.1 seconds is the preferred range. Preferred temperatures are those in the range 625° C. to 750° C. for non-cracking reactions and in the range 750° C. to 900° C. for cracking reactions.

Maximum turbulence in the reactants is desirable for its effect on reducing certain disproportion and ensuring thorough mixing and hence rapid reaction of hydrocarbon molecules. The reduction of sooting may be due to the reduction (statistically) of probability of any fresh feed molecule remaining in contact with the vessel wall for more than a brief instant of time, so that degradation via heat absorption is unlikely.

The number of circulations in the loop reactor, which must be considered in terms of mean number of circulations for the same reason as that for residence time, is preferably as high as possible. It is possible to produce a mean number of 6 circulations by using very high injection velocities but for many purposes 1 to 4 is sufficient.

The quantity of steam utilized is preferably in the range of 0.8–2 to 1 part of hydrocarbon feed on the weight basis. Materials other than the particular hydrocarbon feedstock being used and steam may be incorporated in the feed, for example air or methane, however the introduction of air necessarily involves ballasting the produced gas with nitrogen, and whilst this may be tolerable it has side effects e.g. the reduction of flame travel rate. The introduction of methane will only be found economic under exceptional circumstances.

Referring to FIG. 2 the reactor inlet 12 is connected to a pre-heater 21 which includes a coil 22 for pre-heating steam and a coil 23 for pre-heating a hydrocarbon feedstock introduced by conduit 24. A by-pass 25 is provided to enable feedstock which has not been pre-heated to be introduced into the reactor 11. The steam is raised in a boiler 20.

The outlet is connected to a waste heat boiler 26 which may be used to raise process steam, a tar separator 27 and a water condenser 28, the water being returned to the boiler 20. Product gas leaves the condenser 28.

The process of the invention is illustrated in the following examples.

EXAMPLES 1–10

The reactor described above was used for carrying out the reactions described in the following Table 1, the feedstock being gas-oil fed to the reactor at ambient temperature. In the runs shown carbon was detected in the resulting tar only in Examples 7 to 10.

TABLE 1

| Example No. | 1 | 2 | 3 | 4 | 5 | 6 | 7 | 8 | 9 | 10 |
|---|---|---|---|---|---|---|---|---|---|---|
| Furnace temperature (° C.) | 950 | 960 | 1,000 | 1,000 | 970 | 1,060 | 1,070 | 1,140 | 1,130 | 1,200 |
| Steam temperature (° C.) | 820 | 795 | 800 | 800 | 715 | 825 | 790 | 810 | 805 | 830 |
| Product temperature (° C.) | 635 | 638 | 650 | 670 | 640 | 700 | 655 | 750 | 835 | 845 |
| Oil feed (lb./hr.) | 147 | 105 | 75.7 | 67 | 97 | 39 | 150 | 101 | 50 | 48 |
| Steam feed (lb./hr.) | 100 | 100 | 95 | 95 | 102 | 101 | 150 | 98 | 58 | 57 |
| $C_4^-$ gas analysis: | | | | | | | | | | |
| $H_2$ percent by vol | 1.5 | 1.8 | 2.6 | 3.5 | 3.2 | 27.1 | 14.3 | 12.4 | 49.1 | 51.2 |
| CO | | | 0.1 | 0.1 | 0.2 | 6.4 | 0.6 | 1.7 | 3.4 | 11.6 |
| $CO_2$ | | | 0.1 | 0.1 | 0.2 | 5.1 | | 1.3 | 6.2 | 4.7 |
| $CH_4$ | 22.9 | 23.2 | 25.6 | 27.2 | 22.4 | 28.5 | 20.2 | 31.8 | 26.4 | 20.6 |
| $C_2H_4$ | 39.9 | 40.5 | 43.3 | 47.7 | 41.9 | 29.5 | 36.6 | 39.7 | 11.4 | 8.0 |
| $C_2H_6$ | 5.1 | 4.2 | 3.2 | 2.3 | 6.0 | 0.5 | 3.3 | 2.0 | 3.5 | 3.9 |
| $C_3H_6$ | 18.6 | 19.6 | 14.8 | 7.3 | 16.6 | 2.4 | 14.6 | 6.9 | | |
| $C_3H_8$ | | | | | 0.8 | | | 0.9 | | |
| $C_4H_8$ | 12.0 | 10.7 | 10.3 | 11.8 | 8.2 | 0.5 | 10.4 | 3.3 | | |
| $C_4H_{10}$ | | | | | 0.5 | | | | | |

Whilst the foregoing has referred to loop vessels and specifically mentioned examples all of which include a single loop, more complex loops particularly in parallel are possible to provide production capacity or to offer alternative reaction conditions as to pressure and temperatures and possibly catalysts and the like. For example, a proportion of the reactants may be bled off, circulated through a special treatment zone and reintroduced to the vessel continuously; this special treatment zone may facilitate catalytic action and catalyst regeneration without interfering with the continuous running of the reactor vessel.

Any hydrocarbon feedstock may be used but it is preferred to use a distillate which preferably, but not necessarily, boils in the range of 100–400° C. Examples of hydrocarbon feedstocks which may be used are naturally occurring gases and petroleum refining gases, distillate fractions such as gas oil, kerosene and light virgin naphtha, lubricating oil or distillate fractions, steam-cracker tar and possibly "heavy-ends" resulting from various petrochemical processes as well as light fuel oils and other oils containing small quantities of residual fuels and heavy fuel oils.

A preferred apparatus in accordance with the present invention is hereinafter particularly described with reference to the accompanying drawings in which:

FIG. 2 is a schematic diagram of a gasification plant incorporating a reactor as shown in FIG. 1.

Figure 1:
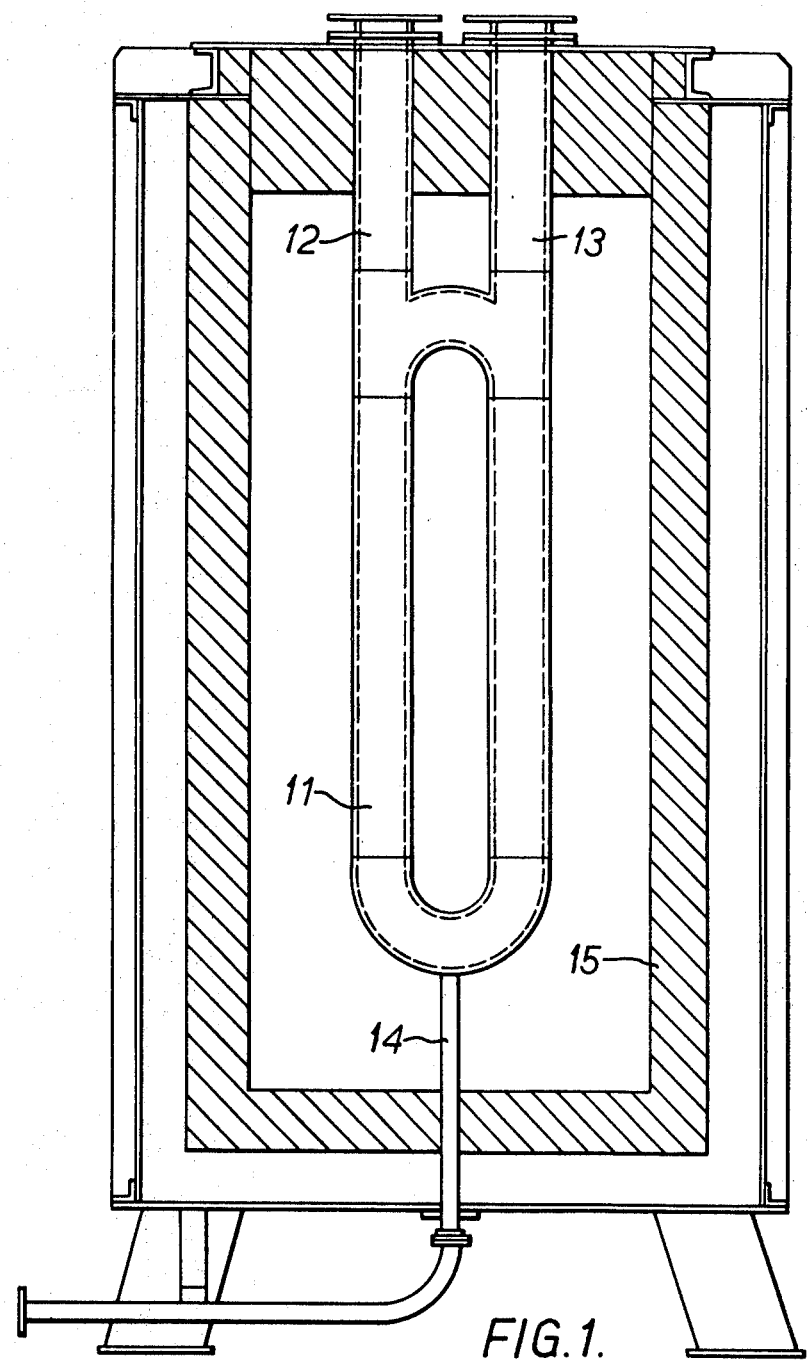
FIG. 1 is a cross section through a reactor.

The reactor comprises a generally toroidal tube 11 having parallel elongated straight side portions, and is constructed from stainless steel tube of internal diameter 4.625 inches and outside diameter 5.25 inches. The inlet 12 and outlet 13 are of similar material and extend parallel to one another. A bleed pipe 14 is provided at the other end of the reactor this being useful for taking samples of the reaction mixture and also serving a mechanical function in that it assists in supporting the free end of the reactor. The reactor is mounted within a furnace 15.

EXAMPLE 11

Using a reactor as above described the proportions of reactants introduced by weight were 1 part of oil to 2 parts of steam, and the reactants were pre-heated to a temperature of the order of 300° C. prior to injection at high velocity into the reactor. At a reactor wall temperature of 950° C., and with a residence time of 1.05 seconds the calorific value of the produced gas formed was around 500 B.t.u.'s per standard cubic foot but there was 20% residue of which ⅔ was carbon and the remainder oily.

EXAMPLE 12

Steam/oil ratio 2.5:1 pre-heated to 330° C. and reacted at wall temperature of 830° C. with 0.92 second residence time. The CV under these conditions was 1000 B.t.u./cu. ft. and the gas contained 7% residue made up equally of oil and carbon.

EXAMPLE 13

Steam/oil ratio 1:1 pre-heated to 280° C. with same reactor temperature as Example 2 but residence time of 0.65 second. The gas contained only 2% residue and had a CV of 1200 B.t.u./cu. ft.

What is claimed is:

1. A process for producing olefinic materials from liquid and gaseous hydrocarbon feedstocks which comprises introducing said hydrocarbon feedstock and steam into a loop reactor, the weight ratio of steam to hydrocarbon feedstock being from about 0.8:1 to 2:1, circulating said hydrocarbon feedstock and steam within said loop reactor, the mean number of circulations of said hydrocarbon feedstock and steam varying from 1 to about 6, said process conducted at a temperature in the range of from about 625° to 750° C. with a mean residence time in excess of 0.5 second and thereafter recovering said olefinic materials.

2. The process of claim 1 wherein said hydrocarbon feedstock is selected from the group consisting of hydrocarbon gases, kerosene, virgin naphtha, hydrocarbon distillates boiling in the range of from about 100 to 400° C. and residual fuels.

3. The process of claim 1 wherein said hydrocarbon feedstock is gas oil.

4. The process of claim 2 wherein the mean residence time of hydrocarbon feedstock and steam within the said reactor varies in the range of from about 0.5 to 1.1 seconds.

5. The process of claim 1 wherein said hydrocarbon feedstock is a hydrocarbon distillate boiling in the range of from about 100° to about 400° C.

6. The process of claim 1 wherein the hydrocarbon feedstock is a gas oil and ethylene is recovered as the predominant olefinic material.

References Cited

UNITED STATES PATENTS

| | | | |
|---|---|---|---|
| 1,963,167 | 6/1934 | Heller | 48—214 XR |
| 2,206,189 | 7/1940 | Hillhouse | 48—214 |
| 2,162,433 | 6/1939 | Hillhouse | 208—129 |
| 2,714,058 | 7/1955 | Stookey et al. | 48—214 X |

MORRIS O. WOLK, Primary Examiner

R. E. SERWIN, Assistant Examiner

U.S. Cl. X.R.

48—105; 260—683